United States Patent
Ryu et al.

(10) Patent No.: US 10,569,247 B1
(45) Date of Patent: Feb. 25, 2020

(54) INSTALLATION AND OPERATION METHOD OF DUAL CONTROL VALVES IN A HIGH PRESSURE FLUIDIZED BED SYSTEM

(71) Applicant: KOREA INSTITUTE OF ENERGY RESEARCH, Daejeon (KR)

(72) Inventors: Ho-Jung Ryu, Daejeon (KR); Doyeon Lee, Sejong-si (KR); Sung-Ho Jo, Daejeon (KR); Hyungseok Nam, Daejeon (KR); Gyoung-Tae Jin, Daejeon (KR); Chang-Keun Yi, Sejong-si (KR); Dowon Shun, Daejeon (KR); Jaehyeon Park, Daejeon (KR); Dal-Hee Bae, Sejong-si (KR); Seung-Yong Lee, Daejeon (KR); Youngcheol Park, Daejeon (KR); Dong-Ho Lee, Sejong-si (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 16/445,917

(22) Filed: Jun. 19, 2019

(30) Foreign Application Priority Data

Mar. 11, 2019 (KR) .......................... 10-2019-0027627

(51) Int. Cl.
*B01J 8/00* (2006.01)
*B01J 8/18* (2006.01)

(52) U.S. Cl.
CPC ........... *B01J 8/1809* (2013.01); *B01J 8/1818* (2013.01); *B01J 8/1872* (2013.01); *B01J 2208/00539* (2013.01); *B01J 2208/00548* (2013.01)

(58) Field of Classification Search
CPC ..... B01J 8/00; B01J 8/18; B01J 8/1809; B01J 8/1818; B01J 8/1872; B01J 2208/00; B01J 2208/00008; B01J 2208/00539; B01J 2208/00548
See application file for complete search history.

(56) References Cited

U.S. PATENT DOCUMENTS

| 6,301,546 | B1 * | 10/2001 | Weinstein | ............. B01J 8/1809 702/23 |
| 9,506,691 | B2 * | 11/2016 | Orr | ......................... F26B 3/084 |
| 2008/0267834 | A1 | 10/2008 | Kim et al. | |
| 2017/0268768 | A1 | 9/2017 | Ryu et al. | |

FOREIGN PATENT DOCUMENTS

| KR | 10-0756310 B1 | 9/2007 |
| KR | 10-2017-0061762 A | 6/2017 |
| KR | 10-2017-0061763 A | 6/2017 |
| KR | 10-1767335 B1 | 8/2017 |

* cited by examiner

*Primary Examiner* — Natasha E Young
(74) *Attorney, Agent, or Firm* — Birch, Stewart, Kolasch & Birch, LLP (57) ABSTRACT

The present invention is directed to a high pressure fluidized bed system using dual control valves, and an inner pressure control method thereof. The high pressure fluidized bed system includes a fluidized bed reactor, a pressure sensor which measures a pressure in the interior of the fluidized bed reactor, a cyclone part which is coupled to the fluidized bed reactor, a first valve allowing controlling of the exhaust gas, and a second valve allowing manually controlling of exhaust gas except for the exhaust gas controlled by the first valve. The first valve is capable of opening and closing automatically, and the second valve is capable of opening and closing manually, and are used in combination in the high pressure fluidized bed, allowing decreasing of the pressure variation within the reactor and improving the operation stability of the reactor.

10 Claims, 7 Drawing Sheets

Related Art

Related Art

INSTALLATION AND OPERATION METHOD OF DUAL CONTROL VALVES IN A HIGH PRESSURE FLUIDIZED BED SYSTEM

CROSS-REFERENCE TO RELATED APPLICATION

The present application claims priority to and the benefit of Korean Patent Application No. 10-2019-0027627 filed in the Korean intellectual Property Office on Mar. 11, 2019, the entire contents of which are incorporated herein by reference.

BACKGROUND

Technical Field

The present invention relates to a high pressure fluidized bed system and an inner pressure control method thereof. Particularly, the present invention relates to a high pressure fluidized bed system using dual control valves and a pressure control method thereof.

Description of the Related Art

A gas-solid fluidized bed (hereinafter, referred to as a fluidized bed) system is equipped with a gas distributor within a reactor, allowing partitioning the interior space of such fluidized bed apparatus into upper and lower portions.

Figure 5:
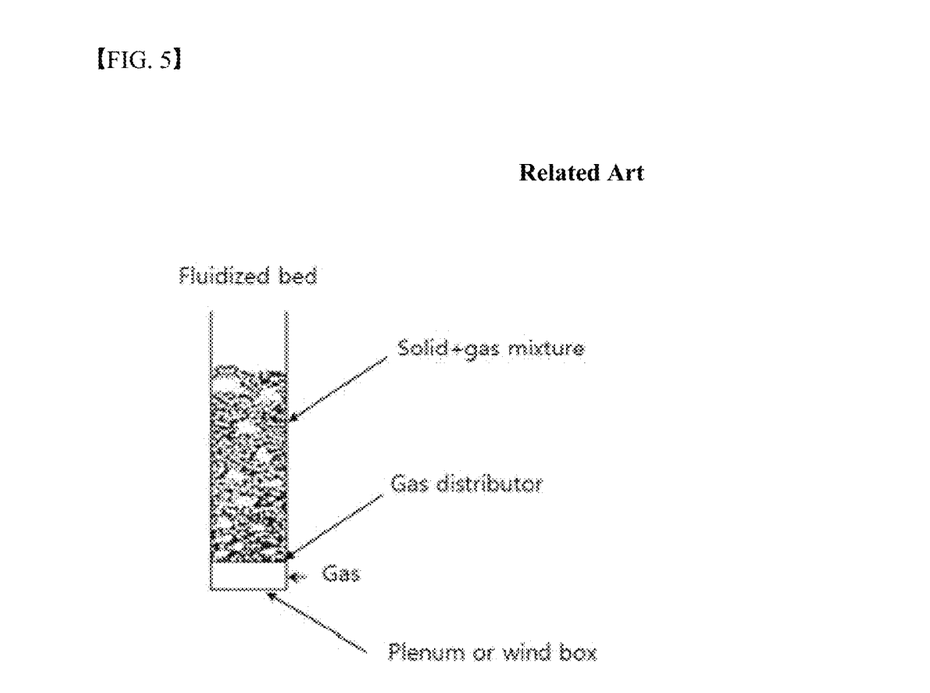
FIG. 5 shows a high pressure fluidized bed reactor according to the related art.

FIG. 5 shows a high pressure fluidized bed reactor according to the related art. Gas is injected into a partitioned lower space and the injected gas is uniformly dispersed through a gas distributor, allowing fluidization of particulate material.

A lower space of the gas distributor is referred to a plenum or a wind box.

In the fluidized bed system, properties of a gas-solid mixture within the reactor vary according to the flow velocity of gas to be injected into the fluidized bed.

Figure 6:
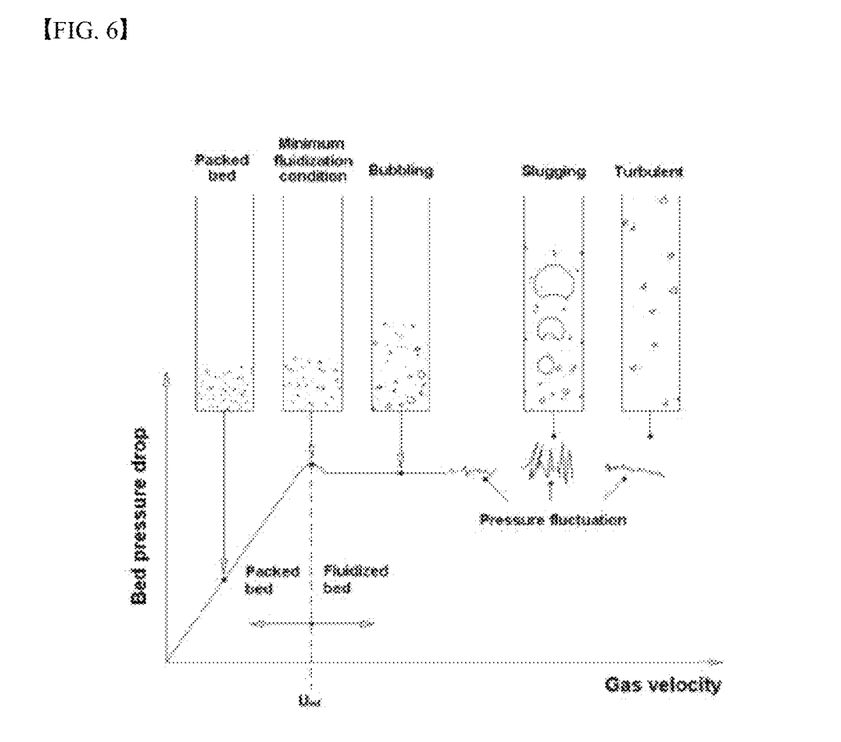
FIG. 6 shows a fluidization flow regime depending on the gas velocity together with a change in the pressure drop (differential pressure) of a solid bed according thereto.

FIG. 6 shows a fluidization flow regime depending on a gas velocity together with a change in the pressure drop (differential pressure) of a solid bed according thereto.

If the gas velocity is low in the fluidized bed system, gas merely flows in spaces among solid particles. Thus, there are hardly any movements of the solid by such gas flow.

The particle bed in a state of such is referred to as a fixed bed.

As the gas velocity is increased, the pressure drop in the solid bed is increased until being the same as the weight of the solid bed.

If the pressure drop becomes equal to the weight of the solid bed, the drag force applied to the solid by gas becomes equal to the force of gravity. Thus, solids become to shake and then start to move.

Such state is referred to as the minimum fluidization condition. At this time, the superficial gas velocity is referred to as the minimum fluidization velocity ($U_{mf}$).

If the gas velocity is henceforth increased continuously, the pressure drop is nearly maintained steady, whereas the solid bed becomes to expand.

In addition, the solids are separated from each other and then behave. Thus, such solids generally show properties similar to the liquid.

The surplus gas remaining after bed fluidization passes through the bed in a large void form and such is referred to as a bubble, similarly in the gas-liquid phase.

The gas velocity at which bubbles are generated for the first time is referred to the minimum bubbling velocity, and the fluidized bed where such fluidization occurs is referred to as a bubbling fluidized bed.

While bubbles generated in the distributor are moving up, such bubbles clash and coalesce with each other, allowing the growth thereof.

Such bubble coalescence becomes intensified as the gas velocity increases. If the diameter of the fluidized bed is small, the diameter of the bubble becomes the same as that of the bed, allowing appearing the separation of the bubble bed and the solid bed.

Such is referred to as slugging.

If increasing the gas velocity unceasingly in a state of slugging, a slug is broken down into a small bubble. Alternatively, in the case of the bubble bed, the frequency of a bubble is increased, allowing improving the uniformity of the bed.

Such is referred to as a turbulent fluidized bed.

If increasing the gas velocity more in the turbulent fluidized bed, the particles cannot remain in a steady solid bed form. Such particles float over the upper portion of the fluidized bed and entrained, allowing the discharge thereof to the outside of the fluidized bed.

Such entrained particles out of the fluidized bed are collected by a solid particle collector, such as a cyclone etc., allowing recirculation thereof to the fluidized bed.

Meanwhile, in the case of a high pressure fluidized bed system which is operated at a high pressure, it is very crucial to control the pressure of the interior of a reactor.

Figure 7:
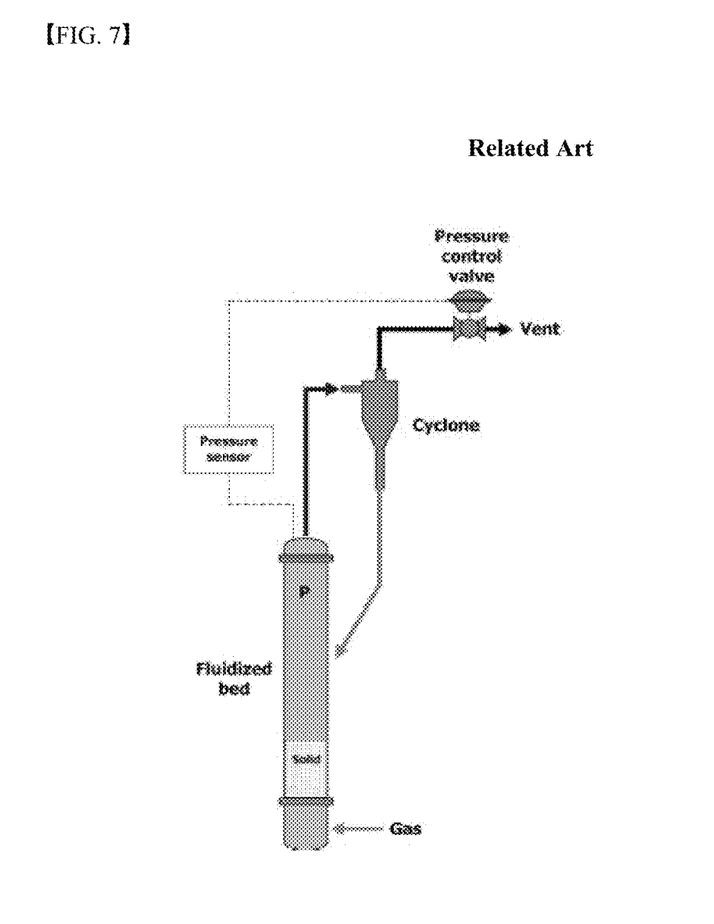
FIG. 7 shows a high pressure fluidized bed system according to the related art.

FIG. 7 show a high pressure fluidized bed system according to the related art.

A pressure sensor is adapted for the measurement of the internal pressure of a reactor A pressure control valve opens and closes the flow path of a gas vent line, allowing the internal pressure (P) of the reactor to reach the desired pressure ($P_{set}$).

That is, when the internal pressure (P) of the reactor is higher than the desired pressure ($P_{set}$), the pressure control valve is opened, allowing decreasing the internal pressure of the reactor.

Meanwhile, if the internal pressure of the reactor is lower than the desired pressure, the pressure control valve is closed, allowing maintaining the pressure of the interior of the reactor.

A conventional high pressure fluidized bed system controls the internal pressure of a reactor using a single pressure control valve.

In the conventional high pressure fluidized bed system, a case for increasing the pressure from the atmospheric pressure to the desired pressure are as follows.

Firstly, the pressure (P) of the interior of the reactor is in a state of lower than the desired pressure.

Accordingly, as the pressure control valve is completely closed, the injected gas cannot be discharged to the outside, allowing remaining in the interior of the reactor.

As continued to inject the gas into the interior of the reactor, the pressure of the interior of the reactor is increased continuously.

While injecting the gas, if the internal pressure (P) of the reactor becomes higher than the desired pressure ($P_{set}$), the pressure control valve is opened, allowing discharging the gas and consequently decreasing the pressure of the reactor.

At this time, the pressure of the reactor reach a moment of becoming lower than the desired pressure during the process for discharging the gas in the interior of the reactor.

Then, as the pressure control valve is closed, the pressure of the reactor is increased to the desired pressure.

Meanwhile, if the gas pressure of the interior of the reactor is decreased, the volume of the gas in the interior of a fluidized bed is increased.

On the contrary to this, if the gas pressure of the interior of the reactor is increased, the volume of the gas in the interior of the fluidized bed is reduced.

During such processes, the volume of the gas in the interior of the fluidized bed is changed according to the change in the pressure in the interior of the fluidized bed. In addition, the gas velocity in the interior of the fluidized bed is continuously changed. In addition, the fluidization flow regime is also changed.

Particularly, when adjusting the pressure of the reactor to the desired pressure through the increase thereof from the atmospheric pressure, if the pressure valve has been completely closed and then is opened for the first time, the internal pressure of the reactor is sharply decreased while the pressure is increased. In addition, as the pressure control valve has been opened for the first time, the gas velocity is sharply increased by the expansion of the gas in the interior of the reactor, allowing the entrainment of the solid in the interior of the fluidized bed reactor.

The entrained solid flows into a cyclone, allowing separating the solid. The solid is transferred to the lower portion, allowing recirculation to the fluidized bed. The gas is discharged to the upper portion.

Particularly, it would be a drawback that the entrainment of the solid exceeds the capacity of the cyclone.

That is, in such case, there may be a drawback that the pressure control valve is blocked by the solid. Alternatively, there may be a drawback that the solid is lost when passing through the pressure control valve and discharged.

In addition, if the gas is consumed or generated by the reaction of the solid in the interior of the fluidized bed and the injected gas, the volume of the gas present in the interior of the reactor is changed. Thus, the inner pressure of the reactor is changed.

That is, the inner pressure of the reactor is changed according to the change in the reactivity of solid particles.

The pressure valve is repeatedly opened and closed depending on the change in the inner pressure of the reactor.

At this time, the gas velocity in the interior of the reactor is changed along therewith. And the residence time of the gas is also changed.

That is, as the reactivity of gas-solid is changed and consequently the quantity of the gas consumed or generated by the reaction is changed, there is a drawback that the pressure in the interior of the fluidized bed reactor is sharply increased or decreased.

RELATED ART DOCUMENT

Patent Document (Patent Document 1) Korea Patent Publication No. KR1822111 B1
(Patent Document 2) Korea Patent Publication No. KR1822117 B1
(Patent Document 3) Korea Patent Publication No. KR1716644 B1
(Patent Document 3) Korea Patent Publication No. KR0582164 B1

SUMMARY OF THE INVENTION

The present invention is directed to a high pressure fluidized bed system which prevents the pressure in the interior of a reactor from changed rapidly and to an inner pressure control method thereof, allowing overcoming the aforementioned drawbacks.

According to the first aspect of the present invention, a high pressure fluidized bed system includes: a fluidized bed reactor; a pressure sensor which measures a pressure in the interior of the fluidized bed reactor; a cyclone part which is coupled to the fluidized bed reactor, allowing collecting entrained particles and releasing exhaust gas; a first valve which is coupled to the cyclone part and the pressure sensor, allowing controlling the exhaust gas; and a second valve which is coupled to the cyclone part, allowing manually controlling exhaust gas except the exhaust gas controlled by the first valve out of the exhaust gas from which the exhaust gas released from the cyclone part.

According to another aspect of the present invention, a permissive flow rate of the second valve is lower than a permissive flow rate of the first valve.

According to another aspect of the present invention, the first valve is automatically controlled by a difference between a pressure value measured by the pressure sensor and a set pressure value.

According to another aspect of the present invention, the second valve is manually controlled in a state that an opening ratio is not 0.

According to another aspect of the present invention, an opening ratio of the second valve is increased and/or decreased in proportion to a velocity in the change of an inner pressure of the fluidized bed reactor.

According to the second aspect of the present invention, in the high pressure fluidized bed system including: a fluidized bed reactor; a pressure sensor which measures a pressure in the interior of the fluidized bed reactor; a cyclone part which is coupled to the fluidized bed reactor, allowing collecting entrained particles and releasing exhaust gas; a first valve which is coupled to the cyclone part and the pressure sensor, allowing controlling the exhaust gas; and a second valve which is coupled to the cyclone part, allowing manually controlling exhaust gas except the exhaust gas controlled by the first valve out of the exhaust gas from which the exhaust gas released from the cyclone part; an inner pressure control method of a high pressure fluidized bed system includes: a first valve setting step for setting up an inner pressure of the fluidized bed reactor as a target value; a gas injecting step for injecting gas into the fluidized bed reactor in a state that the second valve is completely opened; an opening ratio decreasing step for decreasing an opening ratio of the second valve; and a first valve operating step for controlling the first valve to reduce a variation of a pressure of an interior of the fluidized bed reactor.

According to another aspect of the present invention, a permissive flow rate of the second valve is lower than a permissive flow rate of the first valve.

According to another aspect of the present invention, the first valve is automatically controlled by a difference between a pressure value measured by the pressure sensor and a set pressure value.

According to another aspect of the present invention, the second valve is manually controlled.

According to another aspect of the present invention, a velocity in the decrease of an opening ratio of the second valve is controlled in proportion to a velocity in the change of an inner pressure of the fluidized bed.

Therefore, the first valve capable of opened and closed automatically and the second valve capable of opened and closed manually are used in combination thereof in the high pressure fluidized bed system in which pressure variation may occur greatly, thereby decreasing the pressure variation within the reactor and improving the operation stability of the reactor.

Further, the precipitous pressure decrease is suppressed, thereby preventing the increase of the gas velocity within the reactor and of entrained solid discharged to the exterior of the reactor, thereby preventing drawbacks such as the pressure control valve blockage and the solid particle lose, in advance.

DETAILED DESCRIPTION OF THE EMBODIMENTS

The present invention is capable of applied with various modifications and may have diverse embodiments. Thus, particular embodiments will be described accompanying drawing to explain the detailed description of the invention specifically. However, the present invention is not limited to the particular embodiments. It should be understood that the present invention includes all of modifications, equivalents or substitutes which are within the idea and technical scope thereof.

The respective drawings will be described using similar reference symbols for similar elements.

Wording, such as 'first', 'second', etc., are used for explaining various elements. However, such elements should be not limited thereto. Such wording is only used for the purpose of distinguishing one element from others.

For example, a first element may be referred to as a second element. Similarly, a second element may be also referred to as a first element. Wording 'and/or' may include any one of a plurality of described items relevant to each other, or any combination thereof.

All terms including technical or scientific terminology used herein has the same meaning as that to be generally understood by a person having ordinary skill in the art to which the present invention pertains, unless otherwise defined.

Terms defined in the generally used dictionary should be understood to have meanings which correspond to contextual meanings of the relevant technology. It should be not interpreted to have an idealistic or excessively formalistic meaning, unless other defined clearly in this application.

Figure 1:
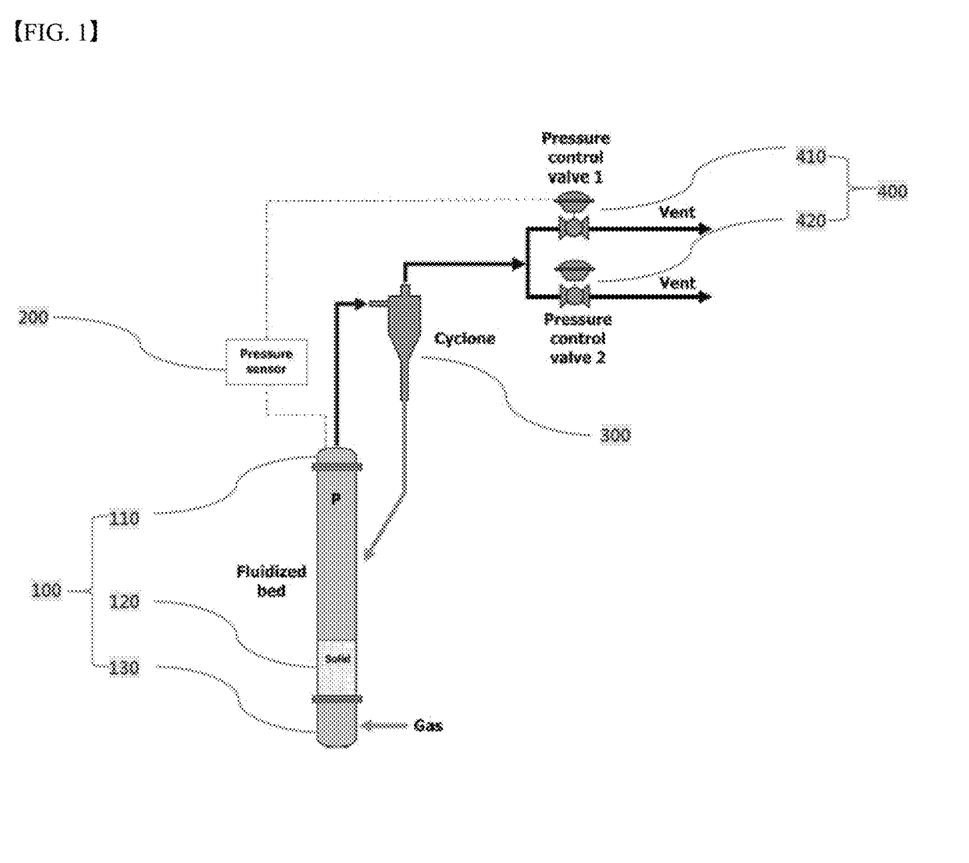
FIG. 1 shows a high pressure fluidized bed system according to an exemplary embodiment.

A fluidization particle 120 may be provided in the interior of the fluidized bed reactor 100.

A gas supply part 130 may be formed in the lower portion of the fluidized bed reactor 100, allowing supplying gas under the fluidization particle 120.

A discharge part 110 may be formed in a upper portion of the fluidized bed reactor 100, allowing releasing the gas in the interior of the reactor.

The discharge part 110 may be coupled to a cyclone part 300.

The cyclone part 300 may collect and release entrained particles from the fluidized bed reactor 100.

A first valve 410 and a second valve 420 may be coupled to the cyclone part 300.

The first valve 410 may be coupled to the cyclone part 300 and a pressure sensor 200, allowing controlling exhaust gas released from the cyclone part 300.

At this time, the first valve 410 may be automatically controlled by a difference between a pressure value measured by the pressure sensor 200 and a set pressure value.

The second valve 420 may be coupled to the cyclone part 300, allowing manually controlling exhaust gas except the exhaust gas controlled by the first valve 410 out of the exhaust gas from which the exhaust gas released from the cyclone part 300.

At this time, it may be preferable to manually control the second valve 420 in a state that an opening ratio is not 0.

Meanwhile, it may be preferable to increase and/or decrease an opening ratio of the second valve 420 in proportion to a velocity in the change of an inner pressure of the fluidized bed reactor 100.

In other words, the opening ratio of the second valve 420 may be increased when the velocity in the change of the inner pressure of the fluidized bed reactor 100 is rapid, while decreased when the velocity in the change of the inner pressure of the fluidized bed reactor 100 is slow.

The pressure sensor 200 may be equipped to be coupled to the first valve 410 and the fluidized bed reactor 100, allowing measuring a pressure in the interior of the fluidized bed reactor 100.

More particularly, the first valve 410 may be coupled with the pressure sensor 200 which measures an inner pressure of the fluidized bed reactor 100.

The first valve 410 may be an automatic control valve which is automatically opened and closed depending on a difference between an inner pressure (P) of the reactor and a desired set pressure ($P_{set}$).

The first valve 410 may be a valve that is capable of opened or closed completely.

Meanwhile, in the case of the second valve 420, a user may control an opening ratio thereof arbitrarily without any sensor such as the pressure sensor 200.

That is, the second valve 420 may be a valve that is capable of operated in a state of having the arbitrarily controlled opening ratio.

The two pressure valves 410 and 420 may be coupled to the side of vent lines formed in a upper portion of the cyclone part 300.

The first valve 410 may automatically control the opening ratio depending on the inner pressure of the fluidized bed reactor 100.

When operating the second valve 420 in a state of not closed completely, that is, the opening ratio is not 0, a portion of the gas injected into the fluidized bed reactor 100 may be discharged through the first valve 410, and the rest thereof may be discharged through the second valve 420.

Accordingly, if the inner pressure of the fluidized bed reactor 100 is increased or decreased, a portion of the gas may be discharged through the second valve 420.

Particularly, in the case that the first valve 410 is closed completely, total gas may be discharged through the second valve 420.

That is, there are the fewer pressure changes in the interior of the reactor as compared with the case that only the first valve 410 is used.

A procedure to adjusting the pressure of the reactor to a desired pressure by increasing the pressure from the atmospheric pressure is as follows.

If setting up a desired pressure ($P_{set}$) to the first valve 410 in a state of the atmospheric pressure, since the pressure (P) in the interior of the reactor is lower than the desired pressure ($P_{set}$), the first valve 410 may be closed completely.

Hereafter, in a state that the second valve 420 is opened all, that is, the opening ratio is 100%, gas is injected into the fluidized bed system.

On this occasion, since the second valve 420 has been opened completely, the gas may be also discharged through the second valve 420.

At this time, if the opening ratio of the second valve 420 is too high, it may be occurred that the pressure is not increased even though the first valve 410 has been closed.

Therefore, in such case, it may be preferable to decrease the opening ratio of the second valve 420, allowing controlling the pressure by the first valve 410.

At this time, it may be preferable to change the opening ratio of the second valve 420 depending on the velocity in the change of the inner pressure of the reactor.

If the opening ratio of the first valve 410 is changed sharply, it may be preferable to increase the opening ratio of the second valve 420, allowing increasing a flow rate of the gas discharged continuously through the second valve 420.

Meanwhile, if there is too much gas discharged through the second valve 420, it may be occurred that the pressure is not increased even though the first valve 410 has been closed.

In this case, it may be preferable to select, as the second valve 420, a valve which is capable of controlling a low flow rate compared to that the first valve 410.

That is, it may be preferable that the permissive flow rate of the second valve 420 is lower than that of the first valve 410.

Hereinafter, described is a control method of an inner pressure of a high pressure fluidized bed system according to the exemplary embodiment of the present invention.

A fluidization particle 120 may be provided in the interior of the fluidized bed reactor 100.

In the first, an inner pressure of the fluidized bed reactor 100 may be set up as a target value (target pressure value), in a first valve setting step.

In the second, gas may be injected into the fluidized bed reactor 100 in a state that a second valve 420 is completely opened, in a gas injecting step.

In the third, an opening ratio of the second valve may be decreased.

In the fourth, a first valve may be controlled, allowing reducing a variation of the pressure in the interior of the fluidized bed reactor 100, in a first valve operating step.

At this time, it may be preferable that a permissive flow rate of the second valve 420 is lower than that of a first valve 410.

Further, it may be preferable to automatically control the first valve 410 by a difference between a pressure value measured by a pressure sensor 200 and a set pressure value (target pressure value).

Meanwhile, it may be preferable to manually control the second valve 420 and to control a velocity in the decrease of the opening ratio of the second valve 420 in proportion to a velocity in the change of an inner pressure of the fluidized bed 100.

Hereinafter, explained is comparison of a test result cording to an exemplary embodiment of the present invention with a test result according to the related art.

Figure 2:
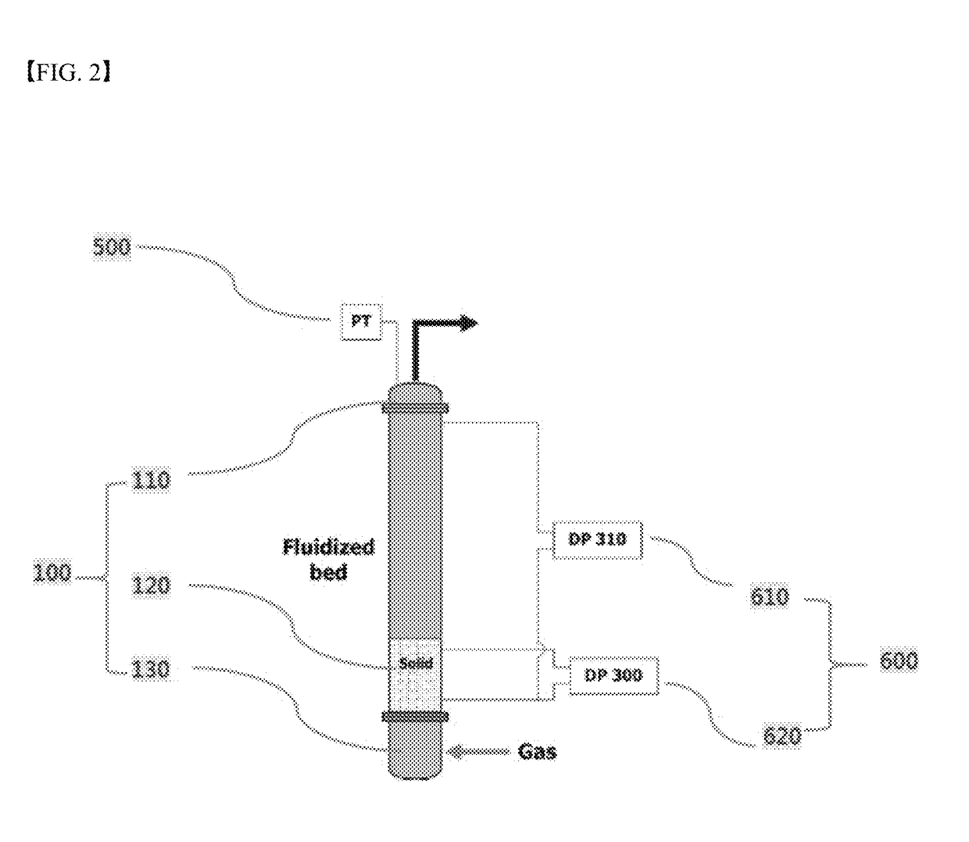
FIG. 2 shows a high pressure fluidized bed system which is equipped with a differential pressure transducer for the test.

FIG. 2 shows a high pressure fluidized bed system which is equipped with a differential pressure transducer for the test.

A fluidized bed reactor had an inner diameter of 0.052 m and a height of 1.2 m. Nitrogen gas was, as a fluidized gas, injected at a flow rate of 0.014 m/s in a lower portion of the fluidized bed reactor 100.

A fluidization particle 120 used a particle having an average particle size of 101 μm, a bulk density of 994 kg/m$^3$ and a minimum fluidization velocity of 0.0068 m/s, and was charged into a height of 0.6 m inside the fluidized bed reactor 100.

The fluidized bed reactor 100 was equipped with two differential pressure transducers 600, i.e., a first differential pressure transducer 610 and a second differential pressure transducer 620, respectively.

One of such differential pressure transducers, the first differential pressure transducer 610 was coupled to pressure taps installed at each height of 0.09 m and 0.99 m respectively from the bottom of a fluidized bed, allowing measuring a differential pressure.

The other one, the second differential pressure transducer 620 was coupled to pressure taps installed at each height of 0.09 m and 0.39 m respectively from the bottom of the fluidized bed, allowing measuring a differential pressure.

The differential pressures measured at the respective positions represent values in proportion to the height of a solid bed present in the interior of a fluidized bed at the each position.

A pressure in the interior of the fluidized bed was measured by a pressure transducer (hereinafter, referred to as PT) 500.

The test was performed at room temperature. The pressure in the interior of the fluidized reactor 100 was measured by the PT and the pressure drop in the interior of the fluidized bed reactor 100 were measured by the first and second differential pressure transducers 610 and 620 respectively, while increasing the pressure from an absolute pressure of 1 bar to 6 bar.

Figure 3:
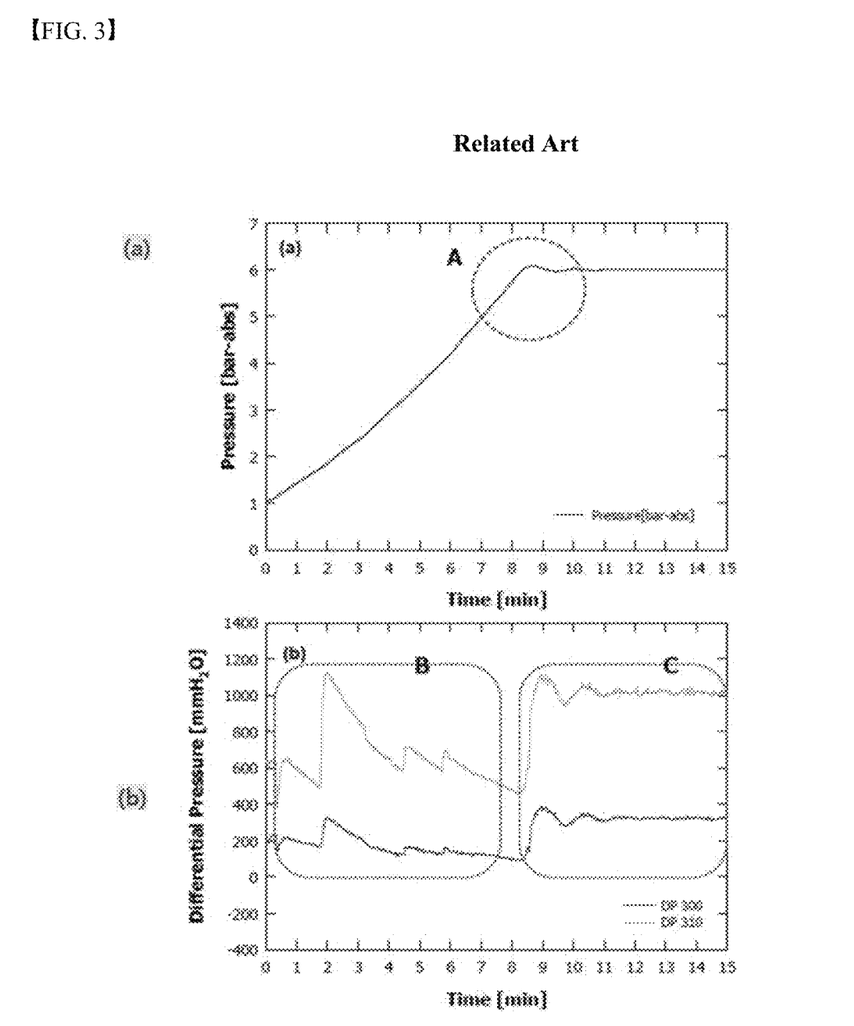
FIG. 3 shows a graph for the test using a single pressure control valve according to the related art.
Figure 4:
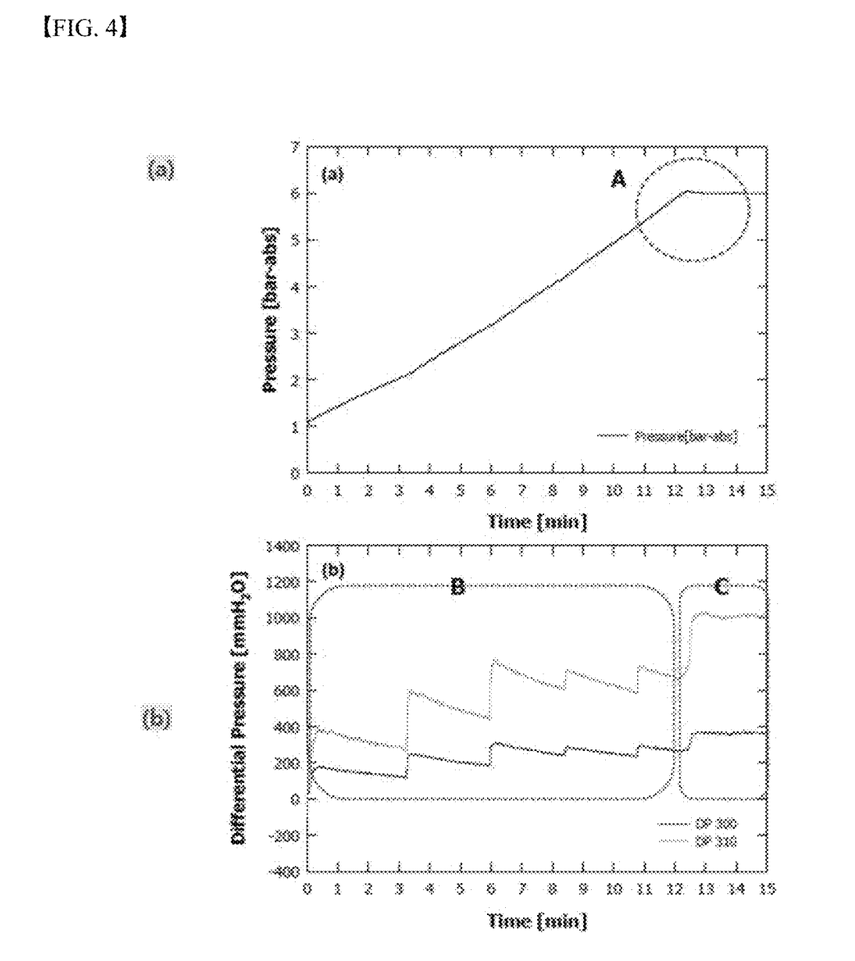
FIG. 4 shows a graph for the test using a dual pressure control valves according to an exemplary embodiment of the present invention.

FIG. 3 shows a graph for the test using a single pressure control valve according to the related art. FIG. 4 shows test result using a high pressure fluidized bed system according to an exemplary embodiment of the present invention.

Firstly, described is the test result using a single pressure control valve according to the related art, referring to FIG. 3.

A pressure in the interior of a fluidized bed reactor 100 was increased from 1 bar. If reaching 6 bar, such pressure was slightly decreased by opening a pressure control valve and then fluctuated for a certain period of time (See Section A), followed by controlled to 6 bar ultimately.

A differential pressure in the interior of a fluidized bed fluctuated sharply (See Section B). If an inner pressure of the fluidized bed reached 6 bar, as the pressure control valve was opened, gas expanded rapidly, allowing sharply increasing values measured from a second differential pressure transducer 620 and a first differential pressure transducer 610. Such values fluctuated, followed by converged on values in a normal state (See Section C).

Hereinafter, described is the test result using a high pressure fluidized bed system according to an exemplary embodiment of the present invention, referring to FIG. 4.

A pressure of a fluidized bed reactor 100 was controlled by dual pressure control valves.

A flow rate of a second valve 420 was half of a first valve 410.

The second valve 420 was in a state of manually opened 30%.

A pressure in the interior of a fluidized bed reactor 100 was increased from 1 bar. If reaching 6 bar, such pressure was slightly decreased by opening a pressure control valve and then controlled to 6 bar ultimately.

If using the dual pressure control valves 400, it took a little more time to reach a desired pressure (6 bar), whereas fluctuation was decreased after reaching the desired pressure (Compare Section A).

A differential pressure in the interior of a fluidization bed tended to show gradual increase and/or decrease while a pressure was increased (Compare Section B). After the inner pressure of the fluidization bed reached the desired pressure 6 bar, it was identified that a change in values measured by a second differential pressure transducer 620 and a first differential pressure transducer 610 was not great (Compare Section C).

REFERENCE NUMERALS

100: a fluidized bed reactor
200: a pressure sensor
300: a cyclone part
410: a first valve
420: a second valve
500: pressure transducer
610: a first differential pressure transducer
620: a second differential pressure transducer

What is claimed is:

1. A high pressure fluidized bed system comprising:
   a fluidized bed reactor;
   a pressure sensor which measures a pressure in the interior of the fluidized bed reactor;
   a cyclone part which is coupled to the fluidized bed reactor, allowing collecting entrained particles and releasing exhaust gas;
   a first valve which is coupled to the cyclone part and the pressure sensor, allowing controlling the exhaust gas; and
   a second valve which is coupled to the cyclone part, allowing manually controlling exhaust gas except the exhaust gas controlled by the first valve out of the exhaust gas from which the exhaust gas released from the cyclone part.

2. The high pressure fluidized bed system of claim 1, wherein
   a permissive flow rate of the second valve is lower than a permissive flow rate of the first valve.

3. The high pressure fluidized bed system of claim 1, wherein
   the first valve is automatically controlled by a difference between a pressure value measured by the pressure sensor and a set pressure value.

4. The high pressure fluidized bed system of claim 1, wherein
   the second valve is manually controlled in a state that an opening ratio is not 0.

5. The high pressure fluidized bed system of claim 4, wherein
   an opening ratio of the second valve is increased and/or decreased in proportion to a velocity in the change of an inner pressure of the fluidized bed reactor.

6. An inner pressure control method of a high pressure fluidized bed system, in the high pressure fluidized bed system according to claim 1, comprising:
   a first valve setting step for setting up an inner pressure of the fluidized bed reactor as a target value;
   a gas injecting step for injecting gas into the fluidized bed reactor in a state that the second valve is completely opened;
   an opening ratio decreasing step for decreasing an opening ratio of the second valve; and
   a first valve operating step for controlling the first valve to reduce a variation of a pressure of an interior of the fluidized bed reactor.

7. The inner pressure control method of a high pressure fluidized bed system of claim 6, wherein
   a permissive flow rate of the second valve is lower than a permissive flow rate of the first valve.

8. The inner pressure control method of a high pressure fluidized bed system of claim 6, wherein
   the first valve is automatically controlled by a difference between a pressure value measured by the pressure sensor and a set pressure value.

9. The inner pressure control method of a high pressure fluidized bed system of claim 6, wherein
   the second valve is manually control.

10. The inner pressure control method of a high pressure fluidized bed system of claim 6, wherein
   a velocity in the decrease of an opening ratio of the second valve is controlled in proportion to a velocity in the change of an inner pressure of the fluidized bed.

* * * * *